United States Patent [19]

Chen et al.

[11] Patent Number: 5,284,037

[45] Date of Patent: * Feb. 8, 1994

[54] AUTOMOTILE STEERING LOCK

[75] Inventors: Shih-Yu Chen; Song-Ming Wang, both of Tainan, Taiwan

[73] Assignee: All Ship Enterprise Co., Ltd., Tainan, Taiwan

[*] Notice: The portion of the term of this patent subsequent to Jun. 11, 2006 has been disclaimed.

[21] Appl. No.: 967,859

[22] Filed: Oct. 28, 1992

Related U.S. Application Data

[63] Continuation of Ser. No. 594,982, Oct. 10, 1990, abandoned, which is a continuation-in-part of Ser. No. 536,742, Jun. 12, 1990, Pat. No. 5,022,246.

[51] Int. Cl.⁵ .............................................. B60R 25/02
[52] U.S. Cl. ......................................... 70/209; 70/226
[58] Field of Search ................ 70/209, 211, 212, 225, 70/226, 237, 238, 380

[56] References Cited

U.S. PATENT DOCUMENTS

| | | | |
|---|---|---|---|
| 4,730,470 | 3/1988 | Zane et al. | 70/238 |
| 4,738,127 | 4/1988 | Johnson | 70/209 |
| 4,747,279 | 5/1988 | Solow | 70/211 X |
| 4,887,443 | 12/1989 | Wang | 70/226 X |
| 4,935,047 | 6/1990 | Wu | 70/238 X |
| 5,022,246 | 6/1991 | Wang | 70/226 X |
| 5,042,278 | 8/1991 | Wang | 70/209 |

FOREIGN PATENT DOCUMENTS

| | | | |
|---|---|---|---|
| 1127524 | 9/1968 | United Kingdom | 70/226 |
| 2024307 | 1/1980 | United Kingdom | 70/238 |

Primary Examiner—Llyod A. Gall
Attorney, Agent, or Firm—Morton J. Rosenberg; David I. Klein

[57] ABSTRACT

An antitheft device for attachment to a steering wheel of an automobile comprising an elongated body member having two parallel passageways extending in a longitudinal direction. A first hook is secured to the body member for engagement with a portion of the steering wheel. The first hook engages the wheel from the inside of the rim, with the body member extending outward beyond the periphery of the steering wheel, an elongated rod member, adapted to move in telescopic fashion in one of two passageways formed in the body member, and extending longitudinally therein. A second hook, secured to the rod member, engages the inside portion of the steering wheel at a point diametrically opposed to that of the first hook. A second elongated rod member is adapted to extend in telescopic fashion in a direction opposite to that of the other rod member. A lock assembly is disposed within the body member for engaging the rods within passageways of the body member, allowing the rod members to extend with respect to the body member, and to be locked at any of a plurality of positions.

1 Claim, 5 Drawing Sheets

AUTOMOTILE STEERING LOCK

REFERENCE TO RELATED APPLICATIONS

This Patent Application is a continuation of U.S. patent application Ser. No. 07/594,982 filed Oct. 10, 1990, now abandoned, which was a continuation-in-part of Ser. No. 07/536,742 filed on Jun. 12, 1990, now U.S. Pat. No. 5,022,246.

FIELD OF THE INVENTION

The present invention relates to an automobile antitheft device. More particularly, the present invention is directed to a device for attachment to an automobile steering wheel to prevent complete rotation thereof, and thereby securing the automobile against unauthorized use.

BACKGROUND OF THE INVENTION

Antitheft devices which attach to an automobile steering wheel are known, such as that shown in U.S. Pat. No. 4,738,127 to Johnson. Such antitheft devices for attachment to a steering wheel of an automobile include an elongated body member having a passage extending therethrough. An elongated rod member is adapted to move in telescopic fashion within the passageway of the body member, and opposed hooks are provided for engaging the inside portion of the steering wheel. A lock assembly is associated with the body member, engaging the elongated rod within the passage for locking the rod member in a stationary position with respect to the body member, at any of a plurality of positions. While the antitheft device described above is functional, it includes several defects. For example, the telescopic movements of the rod member need a key to unlock the lock assembly. Another problem with such devices are that they present pry points wherein a rigid pin or arcuate ruler-like thin object can be inserted through a gap formed between the passageway and periphery of the rod member. The pin is inserted to reach a spherical bearing of the lock assembly and displace it by overcoming the bias force of a spring member, thereby releasing it from engagement with the rod member and defeating the lock.

SUMMARY OF THE INVENTION

It is accordingly a primary object of this invention to provide an automobile steering wheel lock that overcomes the foregoing defects associated with prior art systems.

Another object of this invention is to provide an automobile steering wheel lock that performs unidirectional extension when in a locked condition.

A further object of this invention is to provide a locking device wherein the locking mechanism is totally enclosed, and provides no area susceptible to prying by a crowbar, rigid pin or the like.

DETAILED DESCRIPTION OF A PREFERRED EMBODIMENT

Figure 1:
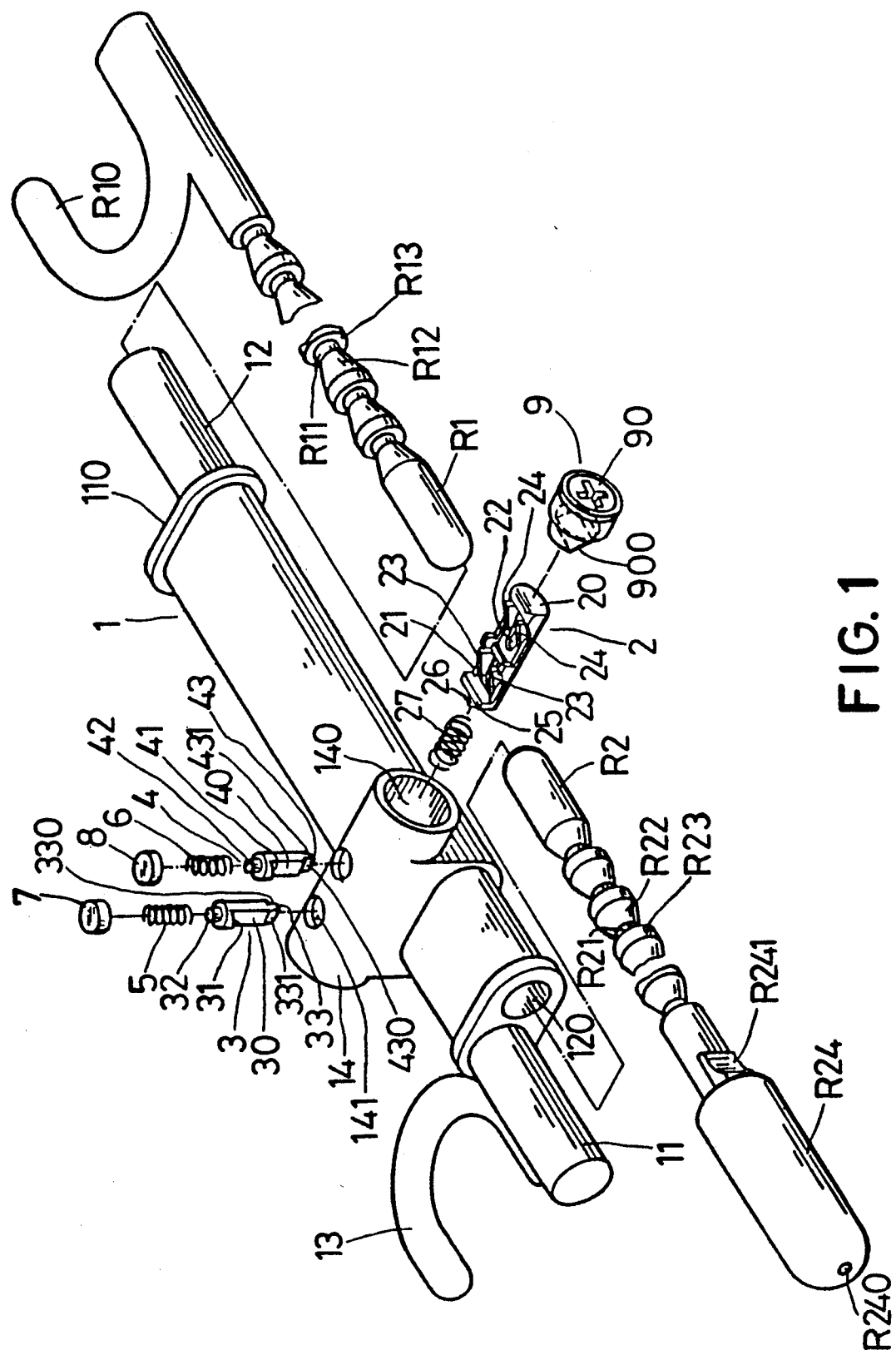
FIG. 1 is an exploded perspective view of a preferred embodiment of the present invention.
Figure 2:
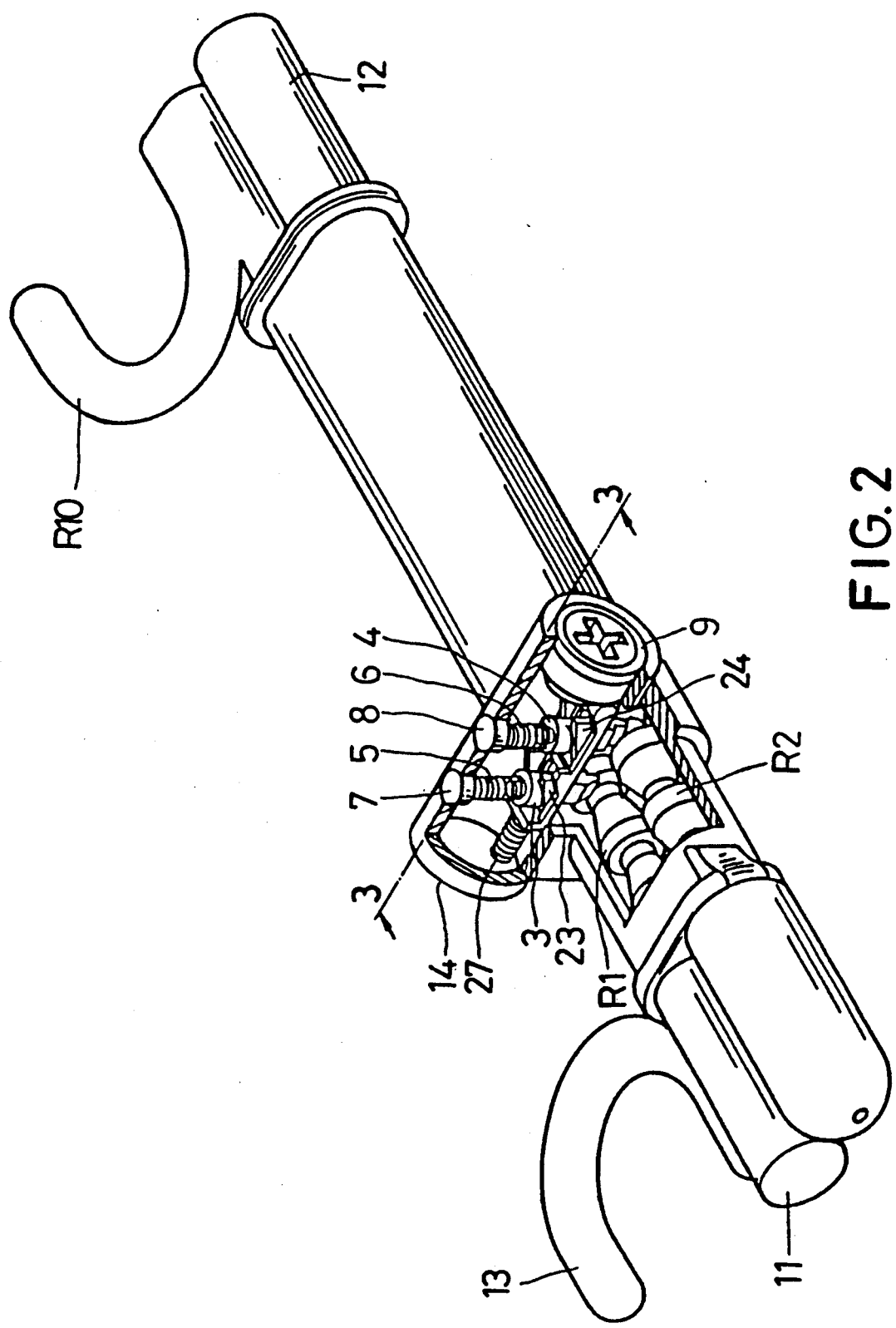
FIG. 2 is a partially cut away perspective view of the present invention which is in an assembled state.

Referring to FIG. 1, there is shown an automobile steering wheel lock according to the invention which comprises an elongated body member 1, a first elongated rod member R1 and a second elongated rod member R2. Elongated rod members R1 and R2 are dimensioned to move in telescopic fashion within body member 1. Hooks 13 and R10 are provided for engaging opposing portions of a steering wheel from inside the open portions thereof. Hooks 13 and R10 are respectively provided on the body member 1 and the first rod member R1. A locking mechanism including a lock 9, an actuator 2 and a pair of bearing members 3 and 4 being provided within the housing 14 to position and lock the rod members R1 and R2 in a stationary position with respect to the body member 1 at any one of a plurality of positions.

The body member 1 includes two parallel elongated tubes 11 and 12 of circular cross-sectional contour. Each of tubes 11 and 12 has a respective open end 110, 120, and an opposing closed end defining a respective central passage extending from the open end 110, 120, and terminating at the respective closed end. Openings 110 and 120 of the body member 1 face opposite directions, so that the first and second rod members R1 and R2 telescope from the body member 1 in opposite directions, one with respect to the other.

Figure 6:
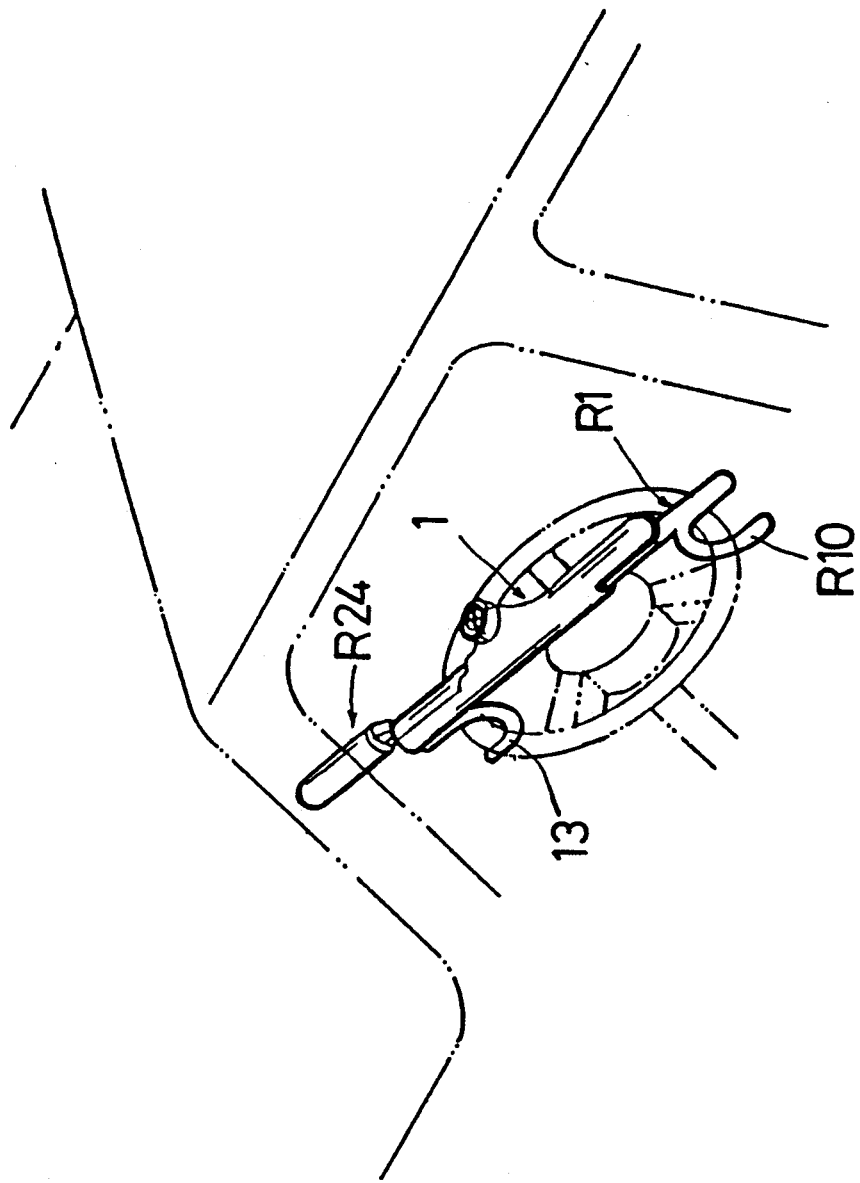

A first generally L-shaped member 13 is fixedly secured to the tube 11, by means of welding, to form a hook 13 which opens rearwardly along the body member 1. The rod member R1 is formed by an elongated rod of circular cross-sectional contour having an outer diameter which is dimensioned to be slightly less than the diameter of the central passage formed in the tube 11 of body member 1. This allows the rod member R1 to telescope freely within the tube 11. The second generally L-shaped member R10 is fixedly secured to the front end portion of the rod member R1 to form a hook R10. Hook R10 has an open end which faces opposite in direction to that of hook 13, for engagement with a diametrically opposed portion of a steering wheel, as best shown in FIG. 6. A plurality of annular grooves R11 are formed in a major portion of rod member R1, the annular grooves being disposed in parallel spaced relation along the longitudinal axis of rod member R1. Each of the annular grooves R11 is defined by a vertical side wall R13 disposed substantially perpendicular to the longitudinal axis of rod member R1, and a convex or sloped side wall R12 extending from side wall R13 to the surface of rod member R1 in a direction extending away from the hook R10.

The rod member R2 is formed by an elongated rod having a circular cross-sectional contour with an outer diameter being dimensioned slightly less than the diameter of the passage formed in the tube 12 of body member 1. This enables rod member R2 to telescope freely within the tube 12. A cartridge R24 containing tear gas is coupled to the outer end of rod member R2. The tear gas can be released through a nozzle R240 by triggering a release button R241, for user's self-protection. A plurality of annular grooves R21, identical to the annular grooves R11 of rod member R1, are formed in parallel spaced relation in a major portion of rod member R2. Each of the annular grooves R21 is defined by a vertical side wall R23, and a convex or sloped side wall R22 extending from side wall R23 to the surface of rod member R2 in a direction extending away from the cartridge end R24.

The lock housing 14 is integrally formed in a mid portion of the body member 1, and includes a central passage 140 extending transversely with respect to the passages of the tubes 11 and 12 of the body member 1, for containing the locking mechanism. The locking mechanism includes the locking assembly 9, an actuating member 2 and the locating members 3 and 4.

Figures 3, 4:
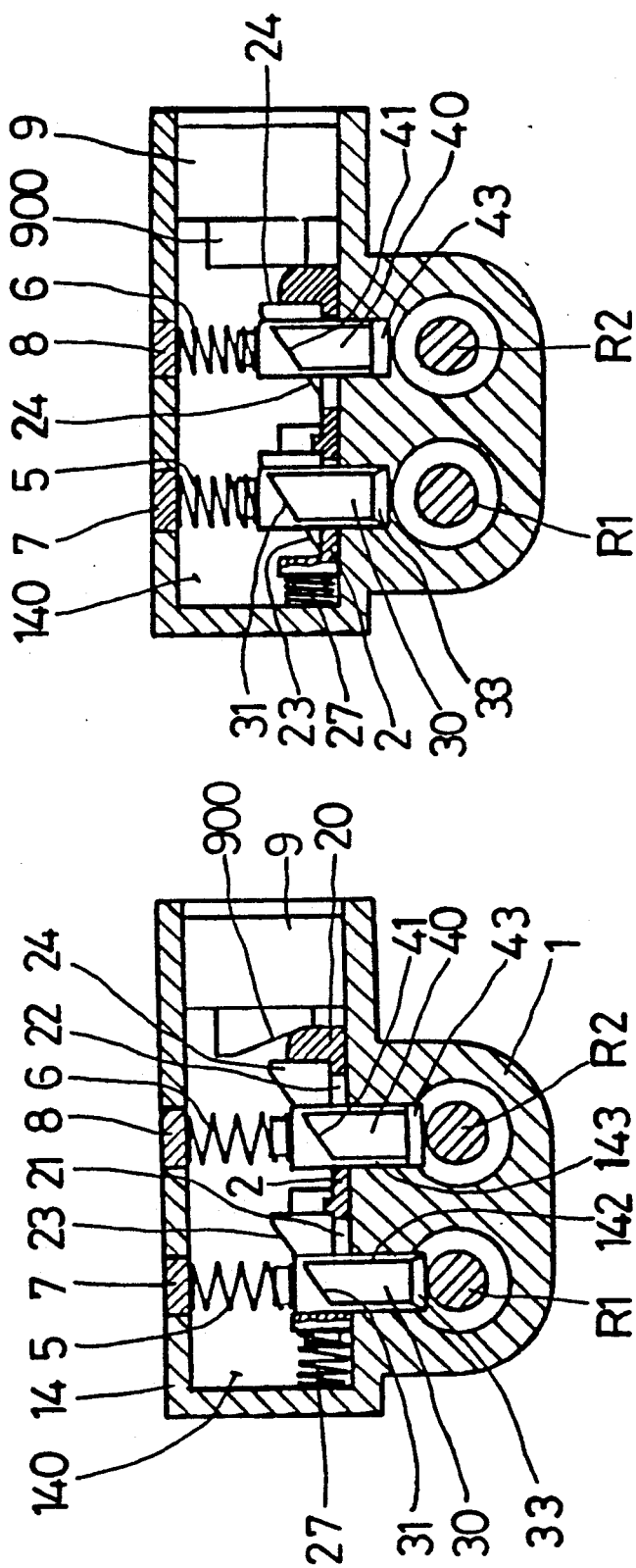
FIG. 3 is a cross-sectional view taken along the section line 3—3 of FIG. 2 in the locked state.
FIG. 4 is a cross-sectional view taken along the section line 3—3 of FIG. 2 in the unlocked state.
Figure 5:
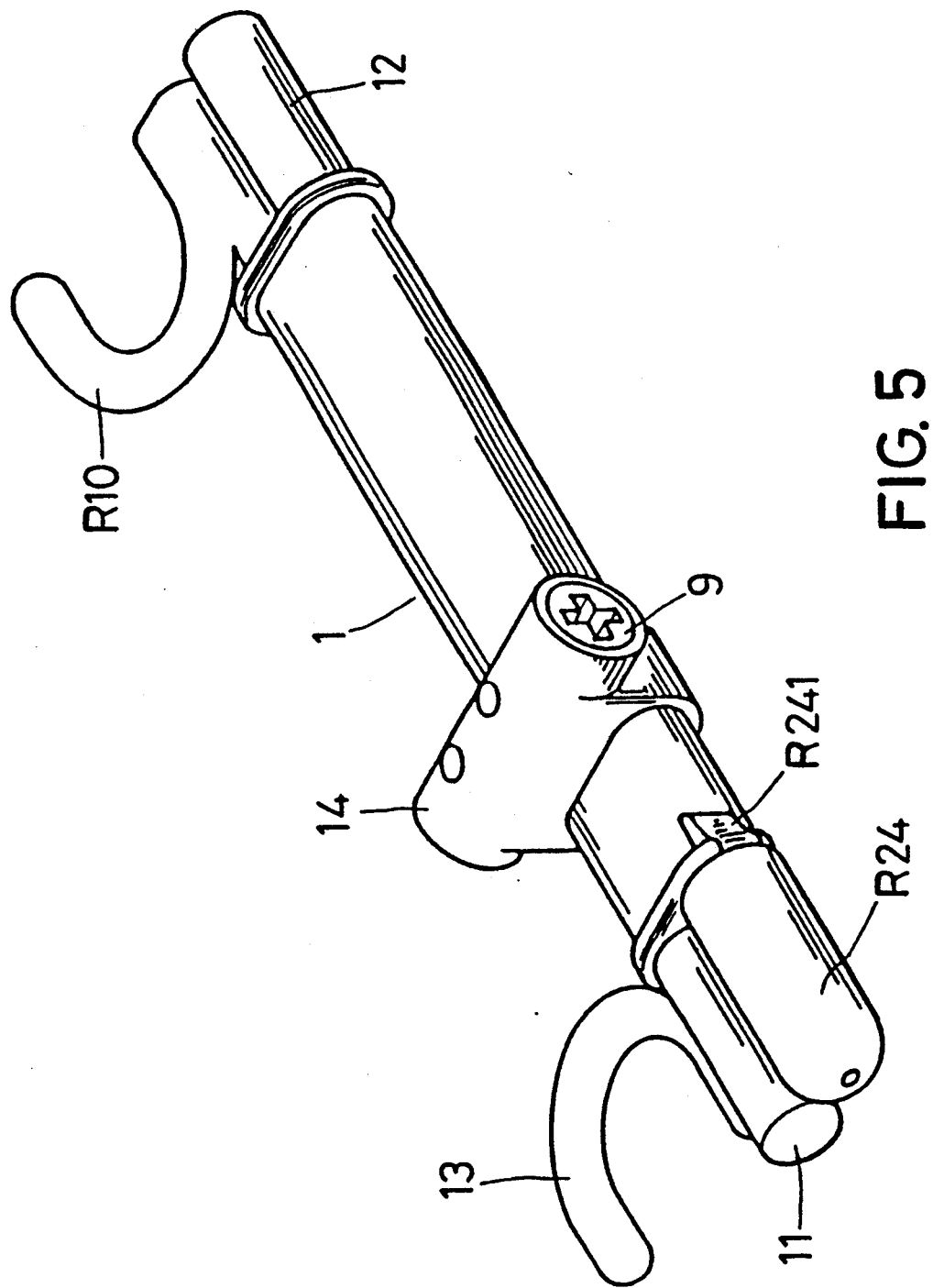
FIG. 5 is a perspective view of the present invention when in an assembled state; and, FIG. 6 is a diagrammatically perspective view showing the steering wheel lock of this invention applied to a steering wheel of a car.

The central passage of housing 14 is defined by a bore 140 extending into the housing 14, for firmly receiving the locking assembly 9. The locking assembly 9 includes a conventional key lock 90 and a cylindrically shaped locking member 900. The locking member 900 is formed with an inclined end. Two passages 142 and 143 each extend between the passage 140 and a respective one of the passages formed in the tubes 11 and 12, in open communication therewith. Each of the passages 142 and 143 extend vertically from the lower portion of the housing 14, as best shown in FIGS. 3 and 4.

The actuating member 2 is formed with an arcuate front wall 20, a rear wall 25 having a projection 26 extending therefrom, for retaining one end of a biasing spring 27. Actuating member 2 further includes two slots 21 and 22, each slot being disposed between a respective one of two pairs of ribs 23 and 24, which serve as cams formed by respective inclined slopes, extending upward, in the direction of front wall 20.

The locating members 3 and 4 are formed by respective rod-like members 30 and 40. The rod-like members are formed with projections 32 and 42 respectively, disposed on the top ends thereof, for receiving the lower end of a respective biasing spring 5, 6. Each of the locating members 3, 4 is provided with respective side camming surfaces 31, 41 for mating with respective inclined slopes of the ribs 23, 24 of the actuating member 2, and a respective insert end 33, 43. The insert ends 33, 43 are defined by respective vertical surfaces 330, 430, and inclined bottom portions 331, 431.

When assembled, as shown in FIGS. 2-5, the locating members 3 and 4 are each inserted into a respective one of the vertical passages 142 or 143 of the housing 14 through openings 141 formed in the upper portion of housing 14. Each of the members 3 and 4 passes through a respective one of the slots 21 and 22 of the actuating member 2. After installation of the locating members 3 and 4, the openings 141 are closed with respective disc plates 7 and 8, for maintaining the members 3 and 4, and respective springs 5 and 6 in position. The springs 5 and 6, thus disposed, normally bias the locating members 3 and 4 downwardly so that insert ends 33 and 43 engage respective grooves R11, R21 of respective rod members R1, R2. The spring 27 having one end disposed on the projection 26 of actuating member 2, has the other end abutting an inner surface of a rear wall of the housing 14, and thereby normally biases the actuating member 2 towards the locking assembly 9.

In operation, when the inclined end 900 of lock 90 is oriented downwardly, as shown in FIG. 3, such positions the actuating member 2 in a first lock position. In this position, the insert ends 33 and 43 of the locating members 3 and 4 are disposed in a lower or first position, and protrude into respective grooves of the rod members to lock the device. In the locked condition, sloped side walls R12, R22 of respective grooves R11, R21 formed in rods R1, R2, allow each of the rod members R1 and R2 to be extended in telescopic fashion from the body member 1, in opposite directions. The rod members are extended by overcoming the biasing forces of the spring members 5 and 6 on respective locating members 3 and 4. However, the vertical side wall R13 of rod member R1 and the vertical side wall R23 of rod member R2, each in abutting relationship to a respective vertical surface 330, 430 of the insert end 33, 43 of respective locating members 3, 4, prohibit the rod members R1 and R2 from being telescopically withdrawn into the body member 1. By this arrangement, when in the locked condition, the rod member R1 can be extended for engaging opposed portions of a steering wheel with the hooks 13 and R10, without using a key to unlock the device. Furthermore, the rod member R2 can also be extended into a corner portion of the vehicle interior, such as between the front windshield and a side window of the car, for restricting the complete rotation of the steering wheel.

When the lock 90 of the locking assembly 9 is rotated 180 degrees to a second position, the inclined end of the locking member 900 forces the actuating member 2 to slide into a second position, by overcoming biasing force of the spring 27, as shown in FIG. 4. The locating members 3 and 4 slide on respective ribs 23 and 24 by means of their respective mating surfaces 31 and 41. The locating members 3 and 4 are thereby displaced from their first lower position to a second elevated position, to release the insert ends 33 and 43 of the locating members 3 and 4 from corresponding grooves of the respective rod members R1 and R2. In this way, rod members R1 and R2 can thus move both in and out, in telescopic fashion with respect to the body member 1.

While the invention has been described with respect to a preferred embodiment, it is obvious that various modifications can be made therein without departing from the spirit of present invention which should be limited only by the scope of the appended Claim.

What is claimed is:

1. An antitheft device for attachment to a steering wheel of an automobile, comprising:
   a longitudinally extended integrally formed housing, said housing including:
   a. a first tubular member extending longitudinally, said first tubular member having a bore extending axially a predetermined distance from an opening formed in a first end of said first tubular member to an opposing second end;
   b. a second tubular member transversely displaced from said first tubular member extending longitudinally in a direction parallel to said first tubular member, said second tubular member having a bore extending axially a predetermined distance from an opening formed in a first end of said second tubular member to an opposing second end;
   c. a substantially L-shaped member coupled to said first tubular member adjacent said second end of said first tubular member and extending therefrom, said L-shaped member defining a hook for engagement with a first rim portion of a steering wheel; and,
   d. a third tubular member extending transverse said longitudinal direction of said first and second tubular members, said third tubular member being cylindrically shaped is formed on an upper surface of said first and second tubular members, said third tubular member having a transversely extending cylindrical passage formed therein, said third tubular member having (1) a first through opening extending between said passage and said bore formed in said first tubular member, and (2) a second through opening extending between said passage and said bore formed in said second tubular member;

a first rod member dimensioned for telescopic receipt within said bore formed in said first tubular member, said first rod member having a plurality of annular grooves formed in axially spaced relation on one end thereof, and having a substantially U-shaped portion formed on an opposing end for engagement with a second rim portion of a steering wheel, each of said annular grooves having an inclined side wall extending from a vertical sidewall of said annular groove;

a second rod member dimensioned for telescopic receipt within said bore formed in said second tubular member, said second rod member having a plurality of annular grooves formed in axially spaced relation on a first end thereof, each of said annular grooves having an inclined side wall extending from a vertical sidewall of said annular groove, said second rod member having a manually operable tear gas cartridge coupled to a second end thereof; and, locking means disposed within said passage of said third tubular member for releasably coupling said first and second rod members to said housing, said locking means including:

a. a pair of spring biased rod-like locating members, each of said locating members being disposed in a respective one of said first and second through openings formed in said third tubular member, each of said locating members having an insert end for respective engagement with one of said plurality of annular grooves of one said respective first or second rod members;

b. an actuating member disposed within said cylindrical passage of said third tubular member, said actuating member having (1) an arcuate front wall, (2) two pairs of upstanding ribs, each of said pairs of ribs being disposed in spaced longitudinal relation, each of said ribs of one of said two pairs of ribs having an inclined camming surface, each of said locating members having a pair of side surface portions disposed in mating relationship with respective inclined camming surfaces of a respective pair of said ribs, and (3) a pair of slotted through openings, each of said slotted through openings being disposed between a respective one of said pairs of ribs, each of said slotted through openings being aligned with a respective one of said first or second through openings for passage of a portion of a respective one of said pair of locating members, said locating members being vertically displaced responsive to lateral displacement of said actuating member; and, c. a lock disposed within said cylindrical passage of said third tubular member and having an inclined end surface abutting said arcuate front wall of said actuating member for laterally displacing said actuating member responsive to a rotative actuation of said lock.

* * * * *